United States Patent [19]

Stapp et al.

[11] 4,053,524
[45] Oct. 11, 1977

[54] HYDROGENATION PROCESS AND CATALYST

[75] Inventors: Paul R. Stapp; Marvin M. Johnson, both of Bartlesville, Okla.

[73] Assignee: Phillips Petroleum Company, Bartlesville, Okla.

[21] Appl. No.: 608,599

[22] Filed: Aug. 28, 1975

[51] Int. Cl.² .................... C07C 29/20; C07C 27/04
[52] U.S. Cl. ...................... 260/631 H; 260/586 P; 252/470
[58] Field of Search ............... 260/631 H, 586 P; 252/470

[56] References Cited

U.S. PATENT DOCUMENTS

| | | | |
|---|---|---|---|
| 2,087,681 | 7/1937 | Lazier | 260/631 H |
| 2,478,261 | 8/1949 | Frank | 260/631 H |
| 2,675,390 | 4/1954 | Rosenblatt | 260/631 H X |
| 3,177,258 | 4/1965 | Rylander et al. | 260/631 H X |
| 3,193,584 | 7/1965 | Rylander et al. | 260/631 H |

*Primary Examiner*—James O. Thomas, Jr.
*Assistant Examiner*—James H. Reamer

[57] ABSTRACT

Aromatic compounds that are hydroxy-substituted on the aromatic nucleus can effectively be hydrogenated by contacting those compounds simultaneously with hydrogen and a catalyst comprising ruthenium supported by $Cr_2O_3$ under alkaline conditions.

3 Claims, No Drawings

HYDROGENATION PROCESS AND CATALYST

This invention relates to the hydrogenation of unsaturated organic compounds and to catalysts for carrying out this hydrogenation. Further, this invention relates to a method to make said catalyst. More specifically the invention relates to the hydrogenation of hydroxy-substituted carbocyclic aromatic compounds.

BACKGROUND OF THE INVENTION

The synthesis of many organic compounds involves a hydrogenation step. By this step an unsaturation, mostly a C=C configuration, is converted into a CH—CH configuration in the presence of hydrogen. This important reaction is carried out by simultaneously contacting the compound to be hydrogenated with a catalyst, e.g., nickel, and with hydrogen.

It is also known to hydrogenate phenol to form cyclohexanol. However, this reaction also produces a certain quantity of cyclohexanone. Generally speaking, the problem exists to hydrogenate hydroxy-substituted carbocyclic aromatic compounds to the corresponding saturated alicyclic alcohols with high yield of alcohols but with little or no production of the corresponding cyclic ketone.

THE INVENTION

It is thus one object of this invention to provide a novel process for the hydrogenation of unsaturated organic compounds.

Another object of this invention is to provide a process for the hydrogenation of hydroxy-substituted carbocyclic aromatic compounds with high yields of the corresponding saturated alicyclic alcohol.

Still another object of this invention is to provide a process for the hydrogenation of hydroxy-substituted carbocyclic aromatic compounds with high conversion rates and high yields of the corresponding saturated alicyclic alcohol.

Another object of this invention is to provide a novel hydrogenation catalyst.

These and other objects, features, advantages and embodiments of this invention will become apparent to those skilled in the art from the following detailed description of the invention, the examples and the appended claims.

In accordance with one embodiment of this invention, we have now found that hydroxy-substituted carbocyclic aromatic compounds can be hydrogenated with good conversion rates and high yields of the corresponding saturated alicyclic alcohol by simultaneously contacting said aromatic compound under alkaline conditions with a catalyst comprising ruthenium dispersed on $Cr_2O_3$.

The compounds which can be hydrogenated in accordance with this invention are compounds having the general formula $R(OH)_z$ wherein R is an aromatic hydrocarbyl radical and z is an integer of from 1 to 4. R is either unsubstituted or substituted by one or more alkyl, cycloalkyl, aryl, or alkoxy radicals. The radical R preferably has 6 to about 20 carbon atoms. For simplicity in the following, these compounds will be referred to as aromatic hydroxy compounds. Examples of suitable aromatic hydroxy compounds include phenol, 4-tert-butylphenol, 4-cyclohexylphenol, 2,4-dimethylphenol, 3-methoxyphenol, 4-ethoxyphenol, 1-hydroxynaphthalene, 2-hydroxynaphthalene, 2-hydroxy-1-methylnaphthalene, 1-hydroxyanthracene, 2-hydroxyanthracene, 9-hydroxyanthracene, 1,4-dihydroxybenzene, 1,2,3,-trihydroxybenzene, 1,2,4,5-tetrahydroxybenzene, 1,4-dihydroxynaphthalene, 2,2-bis(4-hydroxyphenyl)propane, and the like. Phenol is the presently preferred aromatic hydroxy compound.

In accordance with a presently preferred embodiment, a catalyst is used for the hydrogenation which comprises about 0.01 to about 5 weight % of ruthenium on the $Cr_2O_3$ support. More preferably still, this catalyst comprises 0.1 to 1 weight % of ruthenium on the $Cr_2O_3$ support. These ranges of weight percentage are based on the total weight of the catalyst.

More specifically, the aromatic hydroxy compound is simultaneously contacted with an aqueous solution of an alkaline agent selected from the group consisting of alkali metal hydroxides, carbonates and bicarbonates, alkaline earth metal hydroxides and quaternary ammonium hydroxides and mixtures thereof, with said catalyst and with hydrogen. It has been found that a small quantity of alkaline agent in this aqueous solution considerably increases the conversion rate of the aromatic hydroxy compound. Examples of suitable alkaline agents include potassium carbonate, potassium bicarbonate, sodium carbonate, sodium bicarbonate, lithium hydroxide, sodium hydroxide, potassium hydroxide, rubidium hydroxide, cesium hydroxide, barium hydroxide, strontium hydroxide, tetramethyl ammonium hydroxide, tetraethyl ammonium hydroxide, benzyltrimethyl ammonium hydroxide and the like.

The amount of alkaline agent employed can be expressed in terms of mol ratio of said alkaline agent to the aromatic hydroxy compound to be hydrogenated. The ratio will generally be in the range of 0.001 to about 2 mols of alkaline agent per mol of aromatic hydroxy compound charged to the hydrogenation zone. Preferably this ratio will be in the range of about 0.05 to 1.5 mols of alkaline agent per mol of aromatic hydroxy compound charged to the hydrogenation zone.

Whereas the amount of water employed for the preparation of the aqueous alkaline solution is not critical, it should be sufficiently high to dissolve the alkaline agent and, on the other hand, should not be too large to slow down the hydrogenation reaction significantly by the dilution effect. Excessive amounts of water also would be cumbersome for the product recovery and would render the process more costly.

The hydrogenation reaction conditions can be varied in broad ranges. Generally speaking, these conditions will depend upon the desired results, the catalyst concentration and the aromatic hydroxy compound to be hydrogenated. Generally the temperature will be in the range of about 75° to 200° C, preferably in the range of about 100°–160° C. The hydrogen pressure for the reaction usually will be in the range from about 225 to about 5000 psig. The concentration of the ruthenium-chromium sesquioxide catalyst broadly is in the range of about 1 to about 10 weight %, preferably in the range of about 2 to about 7 weight %, of the aromatic hydroxy compound reactant present in the reaction mixture.

The hydrogenation process of the present invention can be conducted as a batch operation or as a continuous process. In the latter type of process, it is preferred to use a series of stirred tanks through which the reactant compound being hydrogenated flows. It is, however, also within the scope of this invention to employ a trickle bed reactor wherein the catalyst is a fixed bed in the reactor and the hydrogen and liquid phase are introduced into the reactor in a concurrent or countercurrent flow relationship.

The hydrogenation of the aromatic hydroxy compounds in accordance with this invention produces the corresponding saturated alicyclic hydroxy compound. For instance, in the preferred embodiment of this invention, phenol is hydrogenated to cyclohexanol. The saturated alicyclic hydroxy compound can be recovered in many instances by simply filtering off the catalyst and fractionally distilling the filtrate. Alternatively, the hydrogenation reaction mixture can be subjected to filtration, neutralization of the alkaline agent and extraction with an aliphatic hydrocarbon solvent or an ether. The extract then is fractionally distilled to recover the product. Alternatively, the hydrogenation reaction mixture can be centrifuged or filtered to recover the solid catalyst which can be returned to the reaction zone with or without further treatment. The filtrate or centrifugate can be subject to a phase separation step wherein the aqueous alkaline phase can be recovered and returned to the reaction zone. The organic phase can then be fractionally distilled to recover the product.

The saturated alicyclic hydroxy compounds have various uses well known in the chemistry art. These products can serve as solvents in many applications. The hydroxy alicyclic compounds can also serve as intermediates in many chemical processes. Cyclohexanol can be converted to adipic acid which is a monomer in the production of polyamides. 4-tert-Butylcyclohexanol can be utilized in perfune compositions. 4-Cyclohexylcyclohexanol can be converted to the acrylic or methacrylic ester for utilization in resin-forming compositions. The dimethylcyclohexanols can be used in detergent compositions and as ore flotation frothing compounds. 2-Methoxycyclohexanol can be used to prepare aluminum complexes useful as reducing agents. 1,4-Cyclohexanediol can be utilized in preparing polyesters and/or polyurethanes or as a component of photographic emulsions. U.S. Pat. No. 2,826,604 shows the utility of 1-decalyl alcohol at col. 4, line 55-col. 6, line 6.

In accordance with still a further embodiment of this invention, there is provided a hydrogenation catalyst comprising ruthenium or a ruthenium compound that is hydrogen-reducible to ruthenium on a $Cr_2O_3$ carrier. This catalyst, as pointed out above, under alkaline conditions effectively hydrogenates aromatic hydroxy compounds to the corresponding alicyclic hydroxy compounds in both good conversion rates and yields. The conversion is the percentage of aromatic hydroxy compound hydrogenated and the yield is the percentage of the hydrogenated compound that is converted into the corresponding alcohol.

The weight ratio of the ruthenium to the chromium sesquioxide ($Cr_2O_3$) can be varied in broad ranges. In accordance with one embodiment of this invention, the catalyst comprises about 0.1 to 5 weight % of ruthenium. The preferred range is 0.1 to 1 weight % of ruthenium. These ranges are based on the total weight of the catalyst.

Furthermore, in accordance with another preferred embodiment of this invention, the catalyst is in particulate form. Preferably the particles have a size such as to pass essentially completely through a sieve of at least 40 mesh (U.S. sieve). Catalysts having an even smaller particle size are also within the scope of this invention. These catalysts essentially entirely pass through sieves with mesh numbers larger than 40.

The hydrogenation catalyst in accordance with a further embodiment of this invention is prepared by mixing particulate $Cr_2O_3$ material with a solution of a hydrogen-reducible ruthenium compound in a solvent to form a mixture, removing essentially all the solvent from the mixture to form a composite, contacting said composite with a reducing agent under reducing conditions such as to reduce said ruthenium compound to metallic ruthenium to form the catalyst, and recovering the catalyst.

Examples of hydrogen-reducible compounds of ruthenium are the ruthenium halides, the alkali metal ruthenium halides and ammonium ruthenium halides, the ruthenium nitrites and the alkali metal ruthenium nitrites and ammonium ruthenium nitrites. Examples for these ruthenium compounds are $RuCl_3$, $RuBr_3$, $K_2Ru(NO_2)_5$, $(NH_4)_2RuCl_5$, etc. It is presently preferred to use a solution of ruthenium chloride ($RuCl_3$). The ruthenium salts for this process have to be at least partially soluble in a solvent such as water, low molecular weight alcohols or mixtures thereof. Water is the presently preferred solvent for the salts.

The chromium sesquioxide in accordance with a presently preferred embodiment of this invention is mixed in particulate form with the solution of the ruthenium compound in such a quantity as to result in about 0.01 to 5 weight % of ruthenium metal on the chromium sesquioxide, said percentage being based on the total weight of the catalyst. Preferably such a quantity of ruthenium compound is used that the catalyst contains 0.1 to 1 weight % of ruthenium metal.

The solvent is removed from the mixture of the ruthenium solution and the chromium sesquioxide particles by evaporating the solvent. The chromium sesquioxide preferably is used in a finely divided form, preferably having such a particle size that the catalyst produced passes essentially entirely through a sieve of at least about 40 mesh (U.S. sieve).

The invention will be still more fully understood from the following detailed examples which show further preferred embodiments of this invention but are not intended to unduly limit the scope of the present invention.

EXAMPLE I

Catalyst Preparation 1.35 Grams $RuCl_3 \cdot 4H_2O$ were dissolved in 100 ml water. The solution was stirred with 100 g of $Cr_2O_3$ in finely divided form while the mixture was heated in an evaporating dish to evaporate the water. The composite obtained was sieved through a 40 mesh sieve. The composite was reduced under hydrogen pressure at about 205° C for 2 hours. The catalyst prepared contained 0.5 weight % of ruthenium dispersed on $Cr_2O_3$.

EXAMPLE II

Hydrogenation of Phenol

The catalyst prepared as described in Example I was used in two runs for the hydrogenation of phenol. In each run, 5.8 grams of the catalyst of Example I was charged with 190 ml water and 96 grams (1 mol) phenol and differing amounts of sodium hydroxide into a 1-liter autoclave which was equipped with heating and stirring means. The amounts of sodium hydroxide in the two runs are shown in the table below. The reactor was flushed with nitrogen, pressured to 650 psig with hydrogen and heated to 150° C within 30 minutes to about 1 hour. The reaction mixture was maintained at about 150° C for 5 to 6 hours and the reactor was pressured to 1000 psig with hydrogen two or three times during the course of the reaction. At the end of the reaction, the reactor was cooled, vented and its contents were removed. Each reaction mixture was acidified with cold concentrated hydrochloric acid and extracted with diethyl ether. The ether extract was filtered and the filtrate distilled to remove the ether. The residue was analyzed by gas-liquid chromatography (GLC). The results of these two runs are shown below in the following table:

| Run No. | NaOH g (mol) | BLC Analysis g | | | | Phenol Conv.,% | Cyclohexanol Yield,[c]% |
|---|---|---|---|---|---|---|---|
| | | Ether | A[a] | B[b] | Phenol | | |
| 1 | 60 (1.5) | 5.5 | 1.9 | 53.0 | 41.7 | 56.6 | 93.6 |
| 2 | 4 (0.10) | 12.4 | 1.8 | 94 | 1.3 | 98.6 | 95.3 |

[a]A is cyclohexanone.
[b]B is cyclohexanol.
[c]Yield calculation is based on phenol converted.

The results shown in the table indicate that cyclohexanol is produced in a very high yield and that a small quantity of sodium hydroxide results in a very good conversion and a very high yield.

EXAMPLE III

Comparative Example

In this example the ruthenium-chromium sesquioxide catalyst was used for hydrogenation without the sodium hydroxide. A 1-liter autoclave equipped with heating and stirring means was charged with 250 grams (2.6 mol) phenol and 5 grams of catalyst prepared in accordance with Example I. The reactor was flushed with nitrogen, pressured to 1200 psig with hydrogen and was heated for 3 hours at 150° C. The hydrogen pressure was essentially unchanged during this period. The reactor was cooled, vented, flushed with nitrogen and opened. The solidified reaction mixture was dissolved in ChCl₃ and the solution filtered to remove the catalyst. The CHCl₃ was removed under vacuum and the residue analyzed by GLC. Only phenol and a trace of CHCl 3 were detected by the analysis.

This result demonstrates that no hydrogenation of phenol took place over the Ru/Cr₂O₃ catalyst in the absence of an alkaline agent such as sodium hydroxide and water.

EXAMPLE IV

Comparative Example Utilizing a Commercially Available Catalyst

Run 1 of Example II was repeated except as specified in the following. Instead of the catalyst of this invention, 5 grams of a commercially available hydrogenation catalyst, which is a 5 weight % palladium on alumina hydrogenation catalyst available from Englehard Minerals and Chemicals Corporation, were used. The reactor was flushed with nitrogen, pressured to 1200 psig with hydrogen and heated to 150° C for 5 hours. During this reaction the pressure decreased from 1575 to 1550 psig. The reactor was cooled, vented and opened. The reaction mixture was filtered to remove the catalyst, acidified with concentrated HCl and extracted with diethyl ether. The ether extract was dried over MgSO₄, filtered and the ether removed under vacuum. The residual which weighed 112.2 grams was analyzed by GLC. The analysis detected only phenol and ether in the residue.

The result of this example shows that a commerically available hydrogenation catalyst (Pd/Al₂O₃) under the conditions used did not hydrogenate phenol.

Two further comparative tests were carried out with commercially available copper chromite hydrogenation catalyst and commercially available ruthenium on alumina hydrogenation catalyst. The commercially available copper chromite hydrogenation catalyst did not reduce phenol in aqueous medium under the conditions employed (150° C and 1675 psig for 5 hours). The ruthenium on alumina catalyst in aqueous medium under the conditions of 150° C and 1600 to 1000 psig during 5 hours resulted in a phenol conversion of only 14 weight %, and the yield of cyclohexanol was only 36%.

Reasonable variations and modifications, which will be apparent to those skilled in the art, can be made in this invention without departing from the spirit and scope thereof.

We claim:

1. A process for the hydrogenation of phenol which comprises admixing said phenol and an aqueous alkaline solution diluent having an alkali concentration such that the mol ratio of alkaline agent to phenol is in the range of 0.001 to about 2 mols per mol of phenol and treating the resulting admixture with hydrogen at a temperature in the range of 75° to about 200° C. and a pressure of about 225 to about 5000 psig in the presence of from 1 to about 10 parts by weight per 100 parts by weight of said phenol of a catalyst consisting essentially of 0.1 to 1.0 weight percent ruthenium on Cr₂O₃ whereby the hydrogenation is effected.

2. A process in accordance with claim 1 wherein said phenol is simultaneously contacted with said alkaline solution, said catalyst and hydrogen.

3. A process in accordance with claim 1 wherein said catalyst contains about 0.5 weight percent ruthenium.

* * * * *